(12) United States Patent
Lau et al.

(10) Patent No.: US 8,640,998 B2
(45) Date of Patent: Feb. 4, 2014

(54) ASSEMBLY TO ATTACH A DISPLAY DEVICE TO A DISPLAY DEVICE SUPPORT

(75) Inventors: Alex Lau, London (GB); Andrew Wills, London (GB); Seiyo Ezure, Tokyo (JP)

(73) Assignee: Colebrook Bosson Saunders Products Ltd., London (GB)

( * ) Notice: Subject to any disclaimer, the term of this patent is extended or adjusted under 35 U.S.C. 154(b) by 231 days.

(21) Appl. No.: 12/574,419

(22) Filed: Oct. 6, 2009

(65) Prior Publication Data
US 2010/0084527 A1  Apr. 8, 2010

(51) Int. Cl.
*A47F 5/00* (2006.01)
*F16L 3/00* (2006.01)

(52) U.S. Cl.
USPC ........ 248/124.1; 248/121; 248/917; 248/920; 248/922; 248/923

(58) Field of Classification Search
USPC ................... 248/274.1, 276.1, 280.11, 284.1, 248/292.11, 291.1, 292.13; 403/83, 91, 403/101, 102
See application file for complete search history.

(56) References Cited

U.S. PATENT DOCUMENTS

| 6,464,589 | B1* | 10/2002 | Shinozuka | 464/102 |
| 6,863,252 | B2* | 3/2005 | Bosson | 248/278.1 |
| 2007/0221794 | A1* | 9/2007 | Li | 248/124.1 |
| 2009/0134285 | A1* | 5/2009 | Huang | 248/124.1 |

FOREIGN PATENT DOCUMENTS

| GB | 1 542 408 A | 3/1979 |
| GB | 2 374 578 A | 10/2002 |
| JP | 2007-303570 | 11/2007 |
| WO | WO 02/076790 A1 | 10/2002 |

OTHER PUBLICATIONS

International Search Report corresponding to Application No. GB0818316.2, dated Feb. 4, 2010; 1 page.

* cited by examiner

*Primary Examiner* — Joshua J Michener
*Assistant Examiner* — Erin W Smith
(74) *Attorney, Agent, or Firm* — Carter, DeLuca, Farrell & Schmidt, LLP

(57) ABSTRACT

An assembly to attach a display device to a support includes a body attachable to a display device support and a mounting member to which a display device is mountable, the mounting member including a collar that defines an axis about which the mounting member is rotatable relative to the body, the collar having a curved inwardly facing seat, the assembly further comprising a biasing member and a resiliently deformable friction element on the body, the biasing member and the friction element being received in the collar with the mating surface facing the seat when the assembly is assembled such that, when the biasing member is moved in an axial direction into the friction element, the biasing member acts on the friction element and the friction element is resiliently deformed by the biasing member to urge its mating surface against the seat to increase the frictional force therebetween.

2 Claims, 16 Drawing Sheets

ASSEMBLY TO ATTACH A DISPLAY DEVICE TO A DISPLAY DEVICE SUPPORT

CROSS REFERENCE TO RELATED APPLICATION

The present application claims the benefit of and priority to United Kingdom Patent Application Serial No. 0818316.2, filed on Oct. 7, 2008, the entire content of which is incorporated by reference.

DESCRIPTION

The present invention relates to a display device support. In particular, the present invention relates to an assembly to pivotally attach a display, such as a flat screen LCD panel, to a display device support that enables the display to be orientated in a desired position to suit the viewer. The present invention also relates to a display device support comprising an assembly to pivotally attach a display to a display device support, a fastener for fastening a flat screen display panel mounting plate to a mounting member, and an assembly for rotatably mounting a display device to a mounting member.

Supports for display devices such as flat screen computer monitors are known and generally comprise an arm or a pair of arms rotatably mounted to each other. A free end of one arm is mounted to a wall or is formed with a sleeve to enable it to be mounted to an upright support post clamped to a desk or workstation. The other free end of the arm, or free end of the other arm, is usually connected to a mounting plate to which a display device is mounted, via a universal joint which enables the screen of a display device mounted to the mounting plate to be located in any desired position.

Such supports for display devices are commonly used in financial trading rooms, and financial traders are surrounded at their workstation or desk by a plurality of display devices which give them the information that they need about share or other prices to enable them to trade and deal. Conventionally, each screen displays a separate piece of information, such that the large amount of information required by a trader is displayed over a number of individual screens. However, there has recently been a trend towards using larger screens and displaying a number of pieces of information on a single screen. For example, nine 19" monitors may be replaced with three 32" monitors on which the screen is divided to show a combination of information at different points on the screen. Further, there has also been a move towards using heavier plasma screens to replace LCD screens.

A disadvantage of conventional supports for display devices is that they are generally unable to support the weight of large display devices or display screens and so there is a need to provide a support which is capable of supporting large display devices.

Known supports are capable of supporting standard sized screens, for example up to 12 kg, however larger screens are heavier and conventional supports are known to fail when a large screen is mounted to it. In such a situation, failure of the support, or in particular, the joint may occur.

SUMMARY

A support for a display device conventionally includes a joint which is arranged to pivot the screen about a horizontal axis against frictional resistance. However, when a heavier screen is used such a joint is unable to maintain the position of the screen and so the screen droops under its own weight.

Conventional joints are generally held together with a threaded fastener, however a problem with such a conventional joint is that when the joint is rotated to adjust the position of a display device then the joint becomes loose due to the threaded fastener rotating in a loosening direction.

A further disadvantage with conventional supports is that it is generally simple to loosen a joint or disassembly the support or universal joint whilst the display device is mounted thereto. This may be done when a user attempts to adjust the resistance of a joint. This may cause the display device to drop suddenly, which may be dangerous to a user and can cause damage to a user and the display device. Therefore, there is a need to prevent a user from loosening or disassembling the support or pivot joints.

The universal joint generally comprises a combination of three individual pivot joints which combine to allow a display device mounted to the support plate to be repositioned along three axes at right angles to each other. The present invention seeks to protect each of the joints both independently and in combination with each other.

Such a universal joint generally extends between two fingers extending at one end from a free end of an arm of the support for a display device. The resistance of the pivot joint allowing rotation about the two fingers is adjustable by tightening screws extending through the fingers. The fingers are urged inwardly as the screws are tightened. However, as a user tightens the screws then the stress in the arms is increased, and if a user over tightens the screw then failure of the arm may occur. Therefore, there is a need to reduce the stress imparted in the fingers.

The present invention therefore seeks to provide a support which overcomes or substantially alleviates the problems discussed above.

According to the present invention there is provided an assembly to pivotally attach a display device to a display device support, the assembly comprising a body attachable to a display device support and a mounting member to which a display device is mountable, the mounting member including a collar that defines an axis about which the mounting member is rotatable relative to the body together with a display device mounted thereto, the collar having a curved inwardly facing seat, the assembly further comprising a biasing member and a resiliently deformable friction element on the body having an outer surface shaped to mate with the seat, the biasing member and the friction element being received in the collar with the mating surface facing the seat when the assembly is assembled such that, when the biasing member is moved in an axial direction into the friction element, the biasing member acts on the friction element and the friction element is resiliently deformed by the biasing member to urge its mating surface against the seat to increase the frictional force between the frictional element and the seat, thereby preventing rotation of the mounting member relative to the body about said axis unless the frictional force is overcome.

Preferably, the friction element comprises an arcuate wall, the outer surface of said arcuate wall defining said outer surface shaped to mate with the seat.

Conveniently, the arcuate wall has an inner surface against which the biasing member acts when the biasing member is moved in an axial direction into the friction element.

Preferably, the inner surface of the arcuate wall tapers in the direction of the insertion of the biasing member into the friction element.

The upstanding wall may comprise a plurality of individually deformable segments.

Advantageously, the biasing member has a tapered side surface which locates against the inner surface of the arcuate wall and the biasing member may be a truncated cone.

The resiliently deformable friction element may comprise a base immovably mounted to the body and the arcuate wall may upstand from the base.

The assembly preferably comprises a slot in the body and a key in the resiliently deformable friction element, the key being received in the slot to attach the friction element to the body.

Advantageously, at least one threaded fastener couples the base of the resiliently deformable friction element to the body.

In one embodiment, the curved inwardly facing seat of the collar is tapered.

Preferably, an end of the collar is separated from the body by a plain bearing.

The urging means may be configured to move the biasing member in an axial direction into the resiliently deformable friction element.

Conveniently, the urging means is a threaded fastener coaxial with the axis of rotation of the mounting member and threadingly engaged with the body, the fastener being coupled to the biasing member such that the biasing member moves in an axial direction into the friction element on rotation of the threaded fastener.

Advantageously, resilient means are disposed between the urging means and the biasing member to urge the biasing member into the friction member.

Preferably, the resilient means is a disc spring.

According to another aspect of the present invention, there is provided a display device support comprising an assembly, wherein said support comprises an arm having a yoke at one end to receive said body of the assembly.

Preferably, the yoke is formed by two fingers extending from the end of the arm, the body being pivotally attached to each finger for rotation about a second axis at right-angles to said axis about which the mounting member rotates relative to the housing.

Conveniently, each finger has a hole extending therethrough with an inner surface that defines the second axis about which the body is rotatable relative to said support, and the support comprises an assembly that locates in said hole to pivotally attach the body to each finger of the display device support arm, the assembly comprising a fastening member that extends through the hole and threadingly engages with the body, and a resiliently deformable member disposed in said hole and immovably mounted to the body when the assembly is assembled, the deformable member having a mating surface engagable against the inner surface of the hole, such that, as the fastening member is tightened the fastening member acts on the deformable member which urges the mating surface against the inner surface of the hole to increase the frictional force between said deformable member and the inner surface of the hole, thereby preventing rotation of the body relative to the support about said second axis unless said frictional force is overcome.

According to another aspect of the present invention, there is provided a fastener for fastening a flat screen display panel mounting plate to a mounting member of an assembly for pivotally attaching a display device to a display device support, the fastener comprising first and second cylindrical members insertable through an aperture in a coupling member and mounting plate respectively, each cylindrical member having a corresponding cam engaging face at one end, and a threaded tightening member that extends through said first and second cylindrical members to fasten them together with the corresponding cam engaging faces abutting each other when assembled, wherein the cylindrical members are configured so that torque is transferred to one of said cylindrical members when the tightening member is urged to turn in a release direction and the cam engaging faces are configured so that the torque increases an axial force applied by said cylindrical member to the tightening member thereby preventing rotation of said tightening member relative to the cylindrical member and loosening of the tightening member.

Preferably, each cam face comprises a helical surface.

In one embodiment, the cam face comprises a plurality of consecutive helical surfaces configured to circumferentially extend around the tightening member.

Advantageously, the pitch of the helical surface of each cam face is greater than the pitch of a thread of the threaded tightening member.

Preferably, the second cylindrical member is fixedly mountable to said mounting plate.

Conveniently, the first and second cylindrical members comprise a mounting ledge extending circumferentially therefrom, locatable against a surface of the coupling member and mounting plate respectively.

Advantageously, the tightening member threadingly engages with the second cylindrical member and torque is transferred to the first cylindrical member when the tightening member is urged to turn in a release direction.

The tightening member may be part-conical and may be locatable against a corresponding conical recess formed in the first cylindrical member.

The fastener may further comprise resilient means configured to impart a resilient axial force by said cylindrical member to the tightening member.

Preferably, the resilient means is locatable between the first cylindrical member and the coupling member.

Advantageously, the resilient means is a disc spring.

According to another aspect of the present invention, there is provided an assembly for rotatably mounting a display device to a mounting member of an assembly for pivotally attaching a display device to a display device support, the assembly comprising a mounting plate, a coupling member and a fastener, wherein the fastener extends through the mounting plate and the coupling member and the mounting plate is configured to rotate about the coupling member.

Preferably, one of said cylindrical members is fixedly mounted to the mounting plate, and the other cylindrical member is configured to rotate with said cylindrical member fixedly mounted to the mounting plate when the mounting plate is rotated.

Conveniently, the second cylindrical member is fixedly mounted to the mounting plate, and the first cylindrical member is configured to rotate with the second cylindrical member when the mounting plate is rotated.

The assembly may further comprise a plain bearing disposed between the first cylindrical member and the coupling member, thereby reducing a frictional force between said first cylindrical member and said coupling member.

DESCRIPTION OF THE DRAWINGS

Several preferred embodiments of the present invention will now be described, by way of example only, with reference to the accompanying drawings in which.

DETAILED DESCRIPTION OF THE EMBODIMENT(S)

Figure 1:
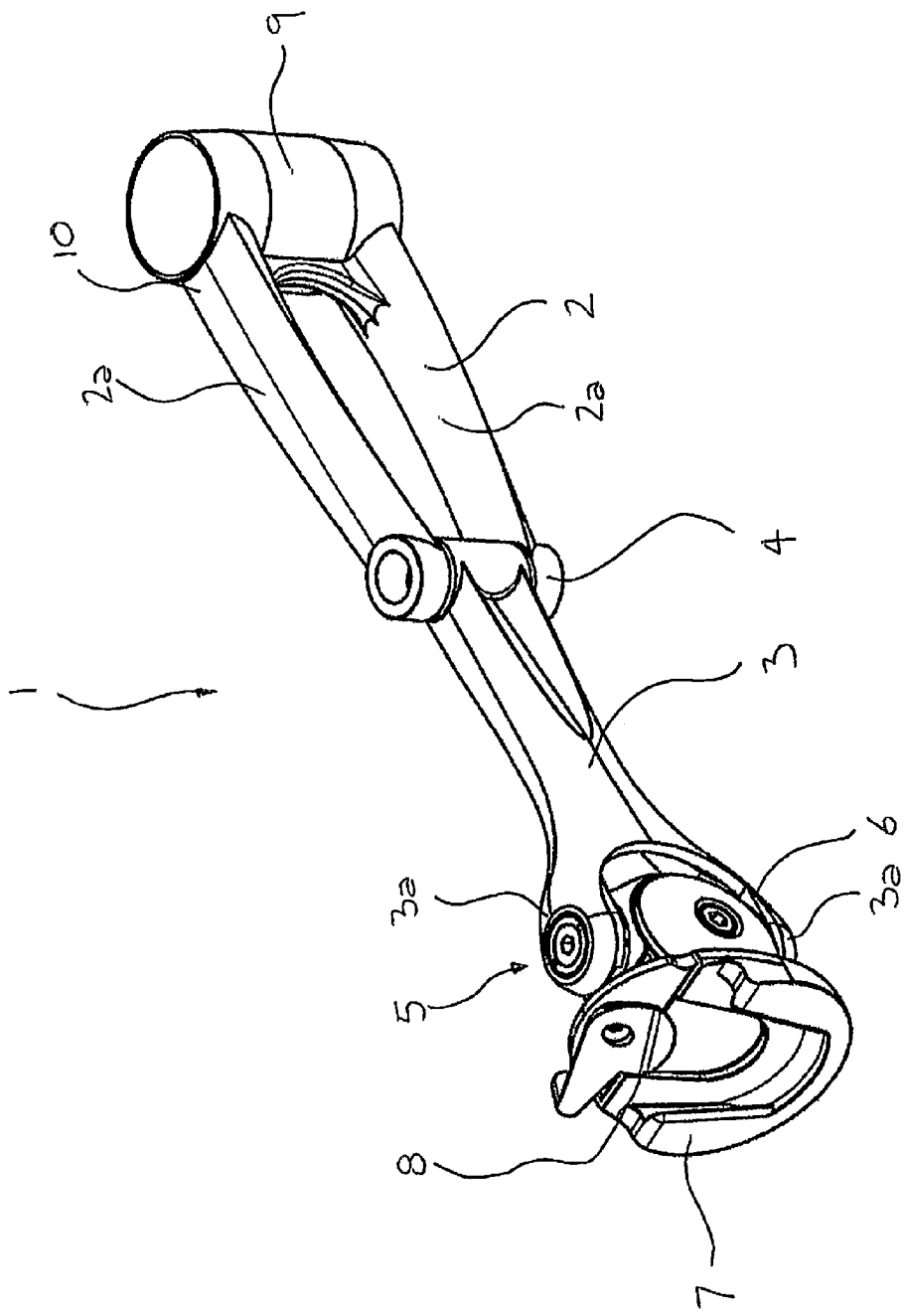
FIG. 1 is a perspective view of a display device support with an assembly to pivotally attach a display device to the support at one end.
Figure 2:
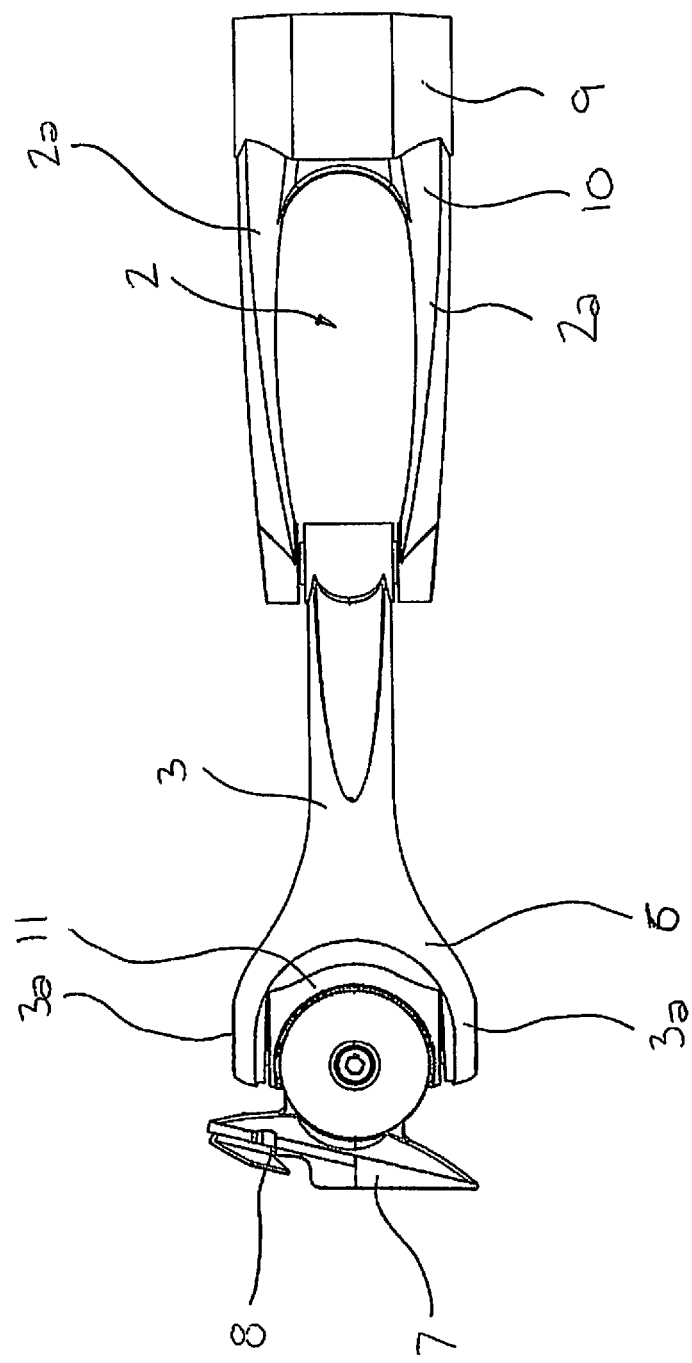
FIG. 2 is a side view of the display device support shown in FIG. 1.

Referring now to the drawings, there is shown in FIGS. 1 and 2 a display device support 1 according to one aspect of the present invention having first and second support arms 2, 3 connected by a hinged joint 4. Each support arm 2, 3 comprises a pair of opposing support fingers 2a, 3a, with the second support arm 3 extending between the support fingers 2a of the first support arm 2 and a hinge pin (not shown) extending therethrough to form the hinged joint 4. An assembly 5 to pivotally attach a display device (not shown) to the display device support 1, which will be described in more detail hereinafter, is mounted to a remote end 6 of the second support arm 3 and is connected to a mounting member 7 to which the display device (not shown), such as an LCD monitor, is releasably attached via a quick release coupling 8. A cylindrical portion 9 is formed at a free end 10 of the first support arm 2 to enable the support 1 to be attached to a bracket (not shown) or an upright support post (not shown) mounted to a wall or clamped to a desk or workstation (not shown).

The support arms 2, 3, support post (not shown) and bracket (not shown) are conventional and so no further description of these components will be given herein.

Figure 3:
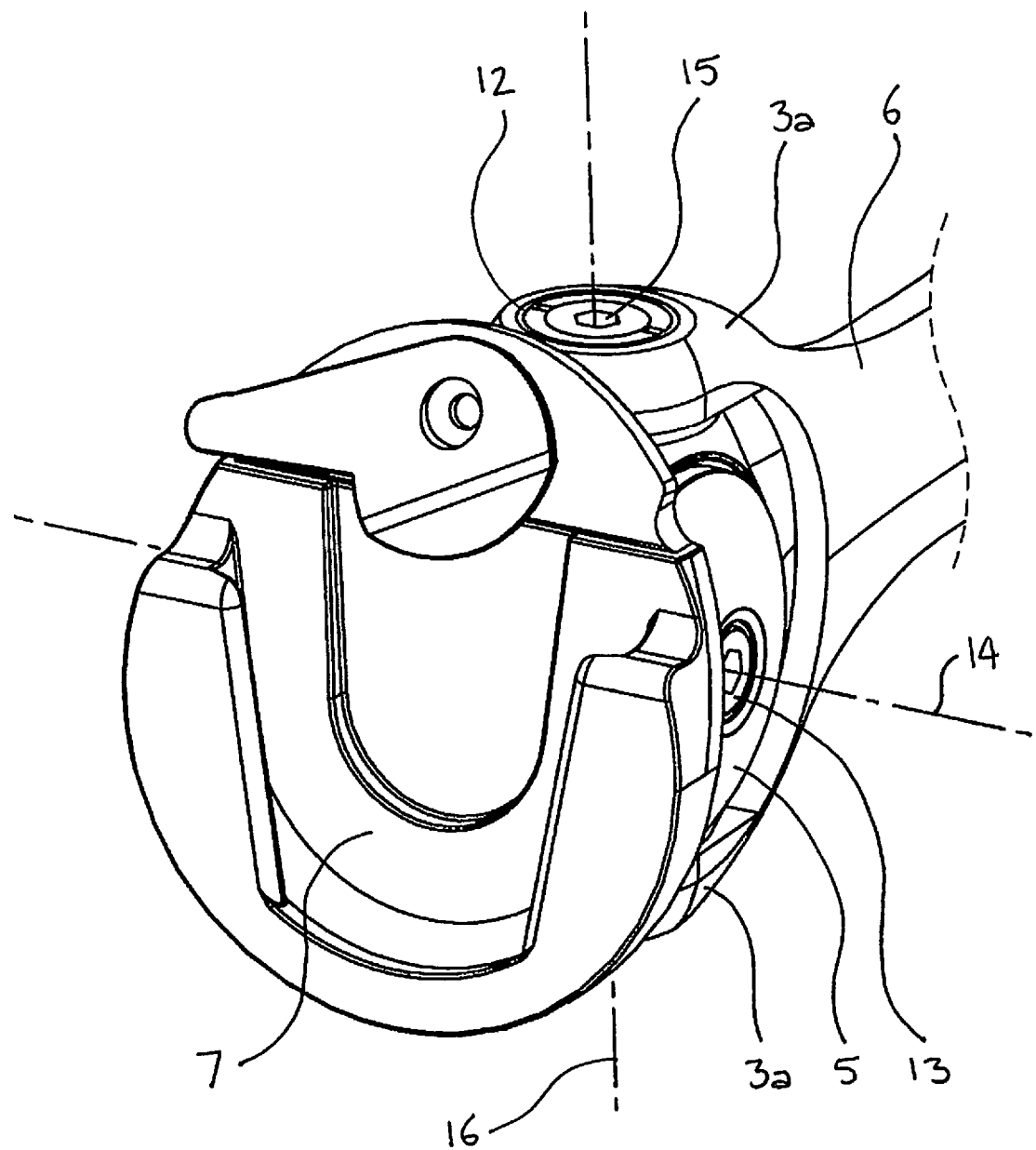
FIG. 3 is a front perspective view of one end of the display device support shown in FIG. 1.
Figure 4:
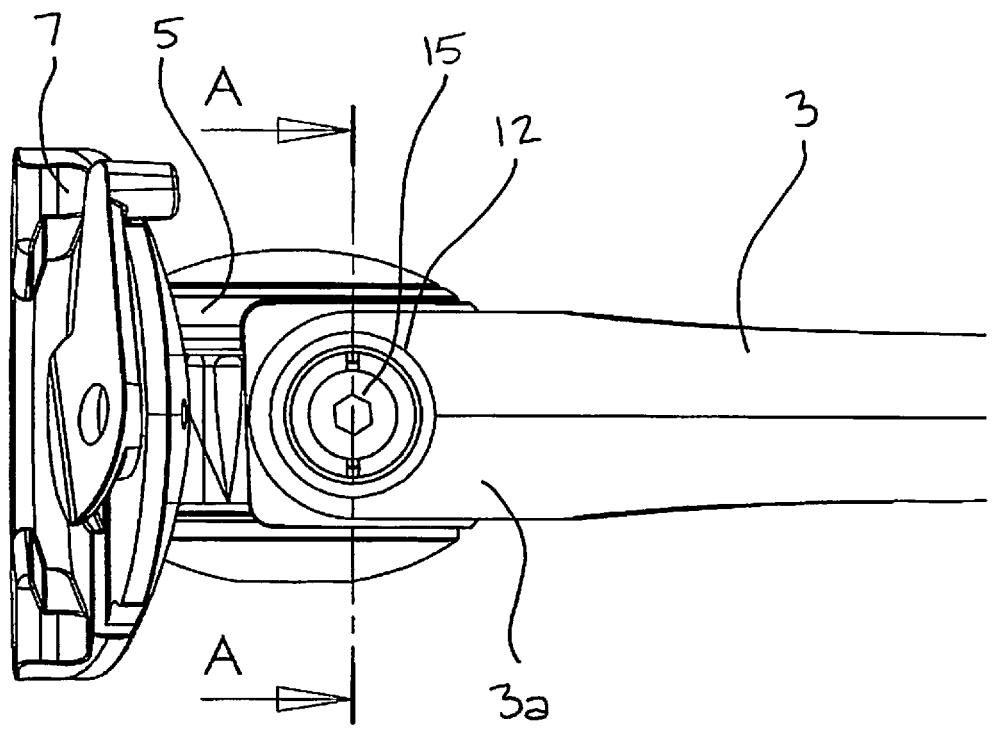
FIG. 4 is a plan view of the end of the display device support shown in FIG. 3.
Figure 5:
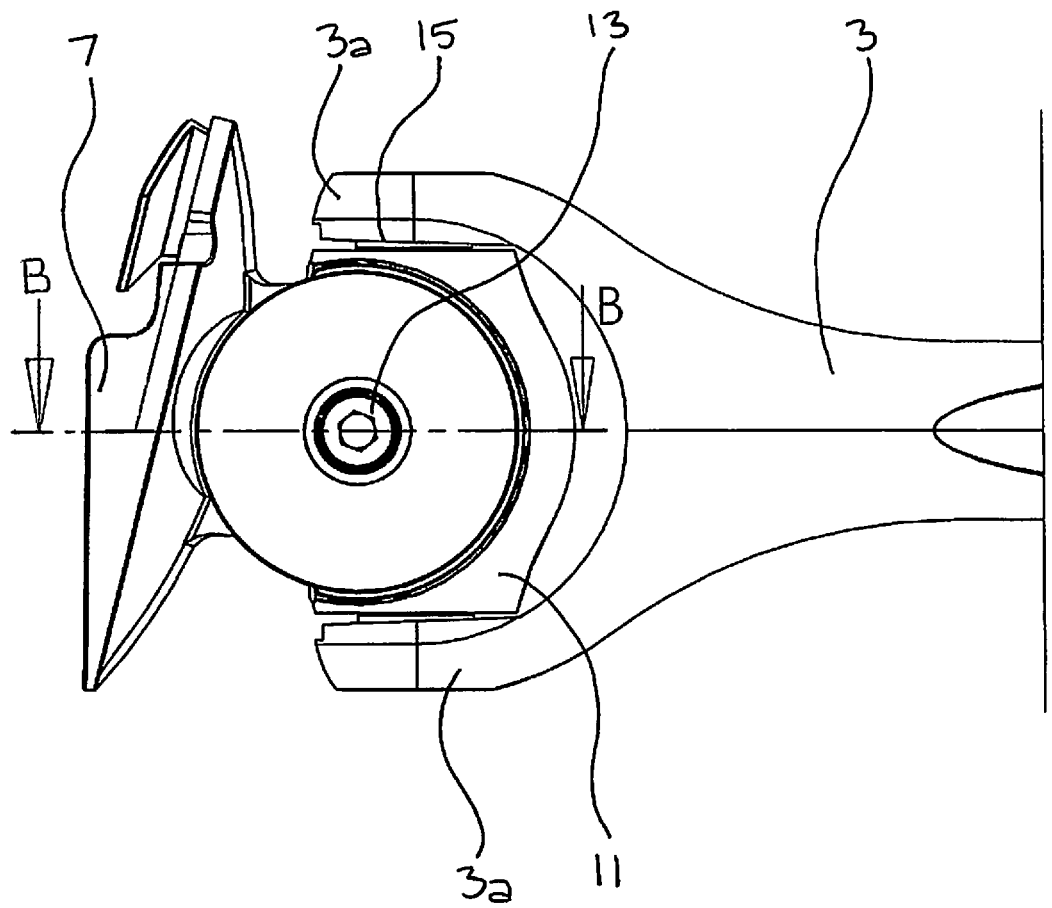
FIG. 5 is a side view of the end of the display device support shown in FIG. 3.

The display device support 1 will now be described in more detail. As shown in FIGS. 3 to 5, the pair of opposing support fingers 3a extending from the end of the second support arm 3 form a yoke and a pivot body 11 extends between the pair of support fingers 3a of the second support arm 3 at the remote end 6 of the second support arm 3. The display device support 1 comprises an assembly 13 according to one aspect of the present invention defining a first pivot joint which enables the mounting member 7 to rotate relative to the second support arm 3 about a first axis 14 (which is shown extending horizontally during use in FIG. 3) and a second pivot joint 15 which enables the mounting member 7 to rotate relative to the second support arm 3 about a second axis 16 (which is shown extending vertically during use in FIG. 3), and which is disposed at a right angle to the first axis 14. Each support finger 3a comprises a conical hole 12 formed therethrough at a distal end of each finger 3a and the conical holes 12 align with each other along the second axis 16.

Figure 6:
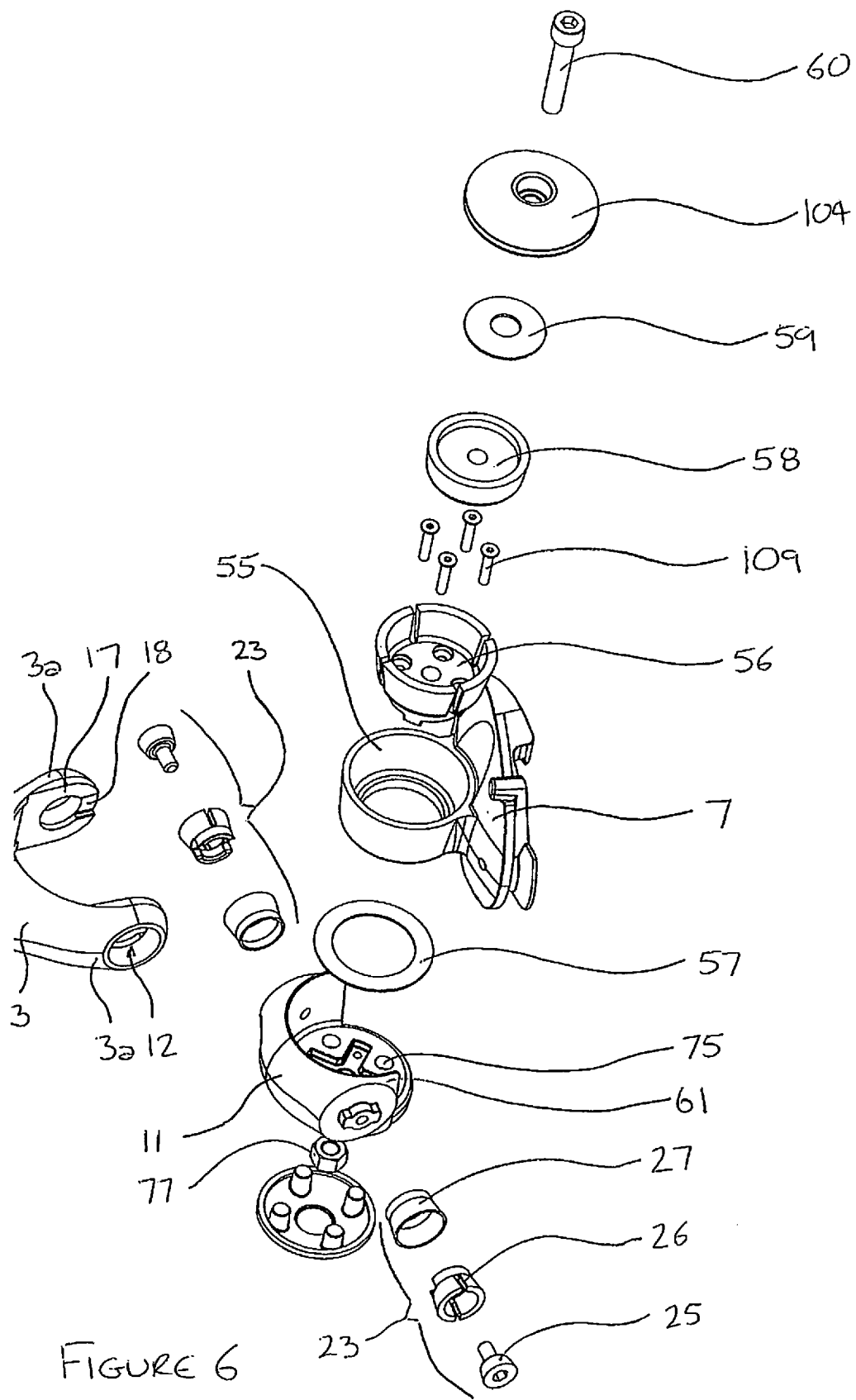
FIG. 6 is an exploded view of the display device support with an assembly to pivotally attach a display device to the support shown in FIG. 3.
Figure 7:
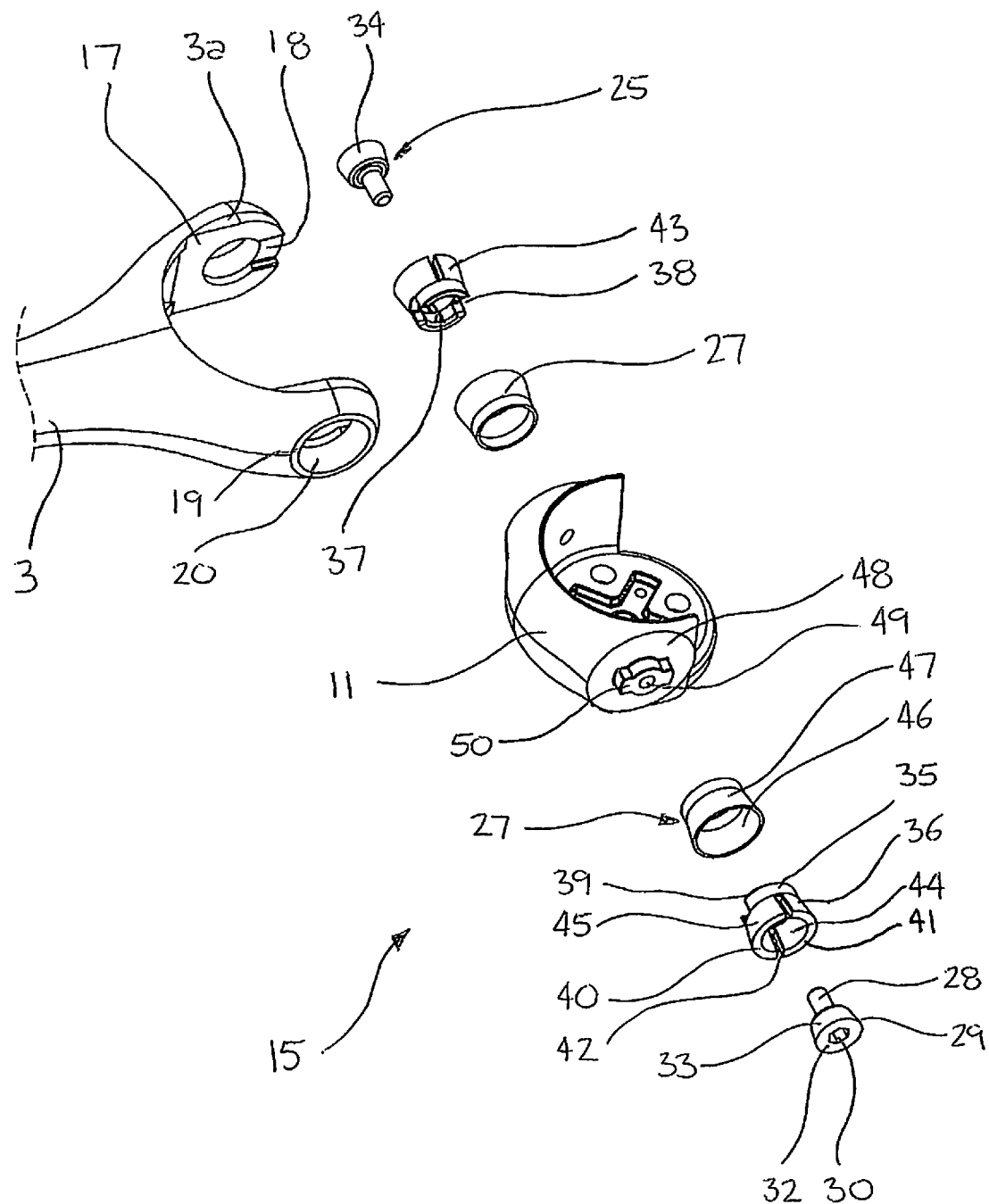
FIG. 7 is an exploded view of a second pivot joint of the display device support shown in FIG. 6.

Referring to FIGS. 6 and 7, exploded views of the second pivot joint 15 of the display device support 1 are shown.

Each support finger 3a of the second support arm 3 has an inner face 17 which opposes a corresponding inner face 17 of the opposing support finger 3a. A slit 18 is formed in each inner face 17 extending radially outwards from each support finger conical hole 12. Each support finger conical hole 12 is outwardly tapered from the support finger inner face 17 to a support finger outer face 19 such that an inner surface 20 of each conical hole 12 diverges.

The second pivot joint 15 enables the pivot body 11, and the mounting member 7 mounted thereto, to rotate relative to the second support arm 3 about the second axis 16. The second pivot joint 15 comprises the yoke formed by the pair of support fingers 3a, the pivot body 11 and an assembly unit 23 that locates in each conical hole 12 to pivotally attach the pivot body 11 to each support finger 3a of the second support arm 3. Although the second pivot joint 15 is described below with an assembly unit 23 associated with each support finger 3a, according to another embodiment the second pivot joint 15 has a single assembly unit 23 only or a shaft extends from the pivot body 11 into the corresponding conical hole 12 formed in the other support finger 3a.

Each assembly unit 23 comprises a fastening member 25, a deformable member 26 and a sleeve 27. The fastening member 25 is a bolt with a threaded shaft 28 and a conical head 29 disposed at one end thereof. A tool engaging portion 30 is formed in a top surface 32 of the conical head 29 in which a tool, for example an Allen key, is receivable to rotate the fastening member 25. A circumferential mating surface 33 of the conical head 29 is tapered, such that the outer surface converges 33 from the top surface 32 towards the threaded shaft 28, to form a wedge shape.

The deformable member 26 is cup shaped and comprises a base 35 and a circumferentially extending wall 36 extending from the base 35. A circular aperture 37 is formed through the base 35 and a pair of diametrically opposite radial slots 38 are formed in a lower end 39 of the base 35, for reasons which will became apparent hereinafter. Two equidistant cut-outs 42 are formed in the circumferentially extending wall 36 extending from an upper end 41 of the deformable member 26, distal to the base 35 and extending theretowards. The cut-outs 42 divide the circumferentially extending wall 36 into arcuate portions 43 which allows a greater degree of flexibility and deformation of the deformable member, because the arcuate portions 43 are capable of flexing relative to each other. Although two cut-outs 42 are described in this embodiment, it will be appreciated that the dimensions and number of cut-outs may vary. Alternatively, the circumferential wall 36 may be formed without any cut-outs 42. The arcuate portions 43 are arcuately spaced about the base 35 such that, when the conical head 29 of the fastening member 25 is disposed in the deformable member 26, the conical head is spaced from the sleeve 27 and the inner surface 20 of the conical hole 12 and the mating surface 33 of the conical head 29 does not come into contact with the sleeve 27 or conical hole inner surface 20, and hence no torque will be applied to the fastening member 25.

Although the above embodiment is described with the deformable member 26 having a base and a circumferential wall extending from the base, it will be understood that the expanding element may not have a base and the radial slots may be formed in the lower end of the circumferential wall.

The circumferential wall 36 of the deformable member 26, together with the base 35, defines a passage extending therethrough with an inner surface 44. The inner surface 44 of the deformable member 26 is tapered such that the passage converges from an opening at the upper end 40 of the deformable member 26 to an opening at the lower end 39. The inner surface 44 substantially conforms to the mating surface 33 of the conical head 29 of the fastening member 25. The deformable member 26 also has an mating surface 45 which is tapered from the upper end 40 to the lower end 41 such that the diameter of the deformable member 26 at the upper end 40 is greater than the diameter of the deformable member 26 at the lower end 41.

The sleeve 27 is expandable and has a tapered through-hole extending therethrough with an upper opening which has a greater diameter to a lower opening, and has a tapered inner surface 46 which substantially conforms to the mating surface 45 of the deformable member 26 such that the deformable member 26 is disposable therein. An external surface 47 of the sleeve 27 is tapered and conforms substantially to the inner surface 20 of the conical hole 12 of the second support arm 3a. The sleeve 27 is formed from a plastic and acts as a plain bearing to allow the deformable member 26 to rotate in the conical hole 12 of the second support arm 3a, as will be explained below.

In an alternative embodiment, the first pivot arrangement 23 does not comprise a sleeve 27 and the mating surface 45 of the deformable member 26 substantially conforms to the inner surface 20 of the conical hole 12 of the support finger 3.

The pivot body 11 comprises a pair of opposing planar faces 48 associated with each assembly unit 23, and a key 50 upstands from each planar face 48. Each key 50 is configured to be received in the radial slots 38 formed in a respective deformable member 26. A threaded hole 49 extends into the pivot body 11, through each key 50. The threaded holes 49 formed in the pivot body aligned on the second axis 16, such that the first and second assembly units 23 are aligned along a common axis, as will become apparent hereinafter.

Figure 8:
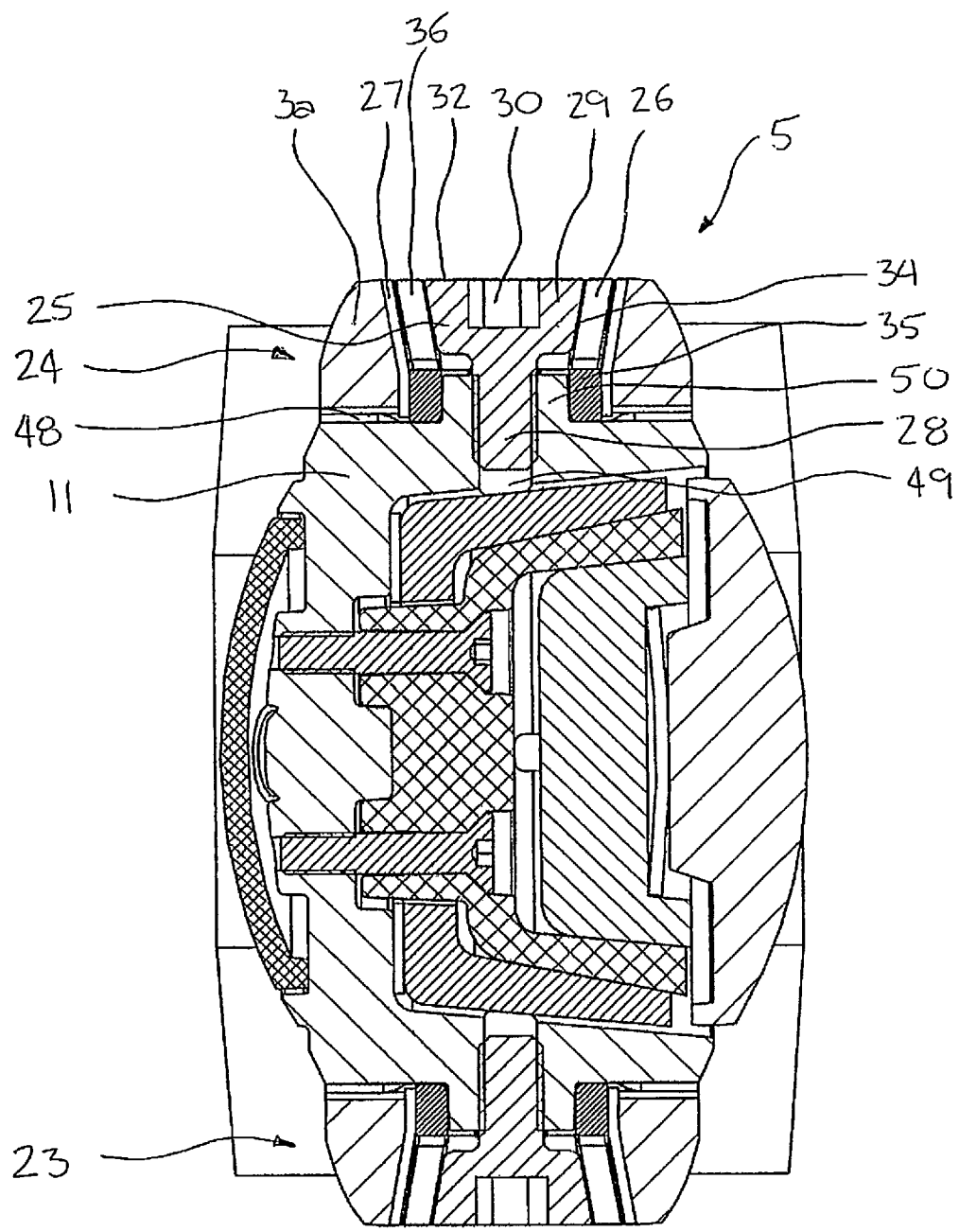
FIG. 8 is a cross sectional view of the second pivot joint shown in FIG. 7 along the sectional line A-A shown in FIG. 4.

The assembly of each assembly unit 23 of the second pivot joint 15 will now be described with reference to FIGS. 7 and 8. The pivot body 11 is disposed between the pair of support fingers 3a of the second support arm 3, such that each planar face 48 of the pivot body 11 faces a respective inner face 17 of the support fingers 3a and each key 50 upstanding from each planer face 48 extends into the respective conical hole 12. The key 50 of the assembly unit 23 is received in the conical hole 12 of the support finger 3 by sliding along the slit 18 formed in the inner face 17 of the support fingers 3a when the pivot body is disposed in the yoke. The pivot body 11 is then free to rotate in the yoke.

The deformable member 26 is disposed in the sleeve 27 and the mating surface 45 of the deformable member 26 locates against the inner surface 46 of the sleeve 27. The sleeve 27 and deformable member 26 are disposed in the conical hole 12 of one of the support fingers 3a and the external surface 47 of the sleeve 27 locates against the inner surface 20 of the conical hole 12. The lower end 39 of the deformable member 26 locates against one of the planar faces 48 of the pivot body 11 and the key 50 upstanding from the planar face 48 is disposed in the radial slots 38 formed in the deformable member base 35. The key 50 is push fitted in the radial slots 38 and interlocks therewith which prevents rotation of the deformable member 26 relative to the pivot body 11.

The sleeve 27 is disposed between the inner surface 20 of the cylindrical hole 12 and the mating surface 45 of the deformable member 26.

The fastening member 25 is disposed in the deformable member 26 such that the threaded shaft 28 extends through the circular aperture 37 of the deformable member base 35 and is threadingly engaged in the corresponding threaded hole 49 formed in the pivot body 11. When the threaded shaft 28 threadingly engages with the threaded hole 49, the conical head 29 of the fastening member 25 locates in the deformable member 26 and the mating surface 33 of the conical head 29 locates against the inner surface 44 of the deformable member 26.

When each fastening member 25 is rotated in a tightening direction by a user inserting a tool in the tool engaging portion 30 and rotating the fastening member 25, the conical head 29 moves in an axial direction towards the pivot body 11 until the mating surface 33 of the conical head 29 locates against the inner surface 44 of the deformable member 26. The first and second assembly units 23 locate the pivot body 11 in the yoke formed by the support fingers 3a of the second support arm 3 and locate the pivot body 11 to define the second axis 16 about which the second support arm 3 is rotatable about the pivot body 11.

The deformable member 26 is prevented from moving relative to the pivot body 11 by the lower end 39 thereof abutting the planar face 22 of the pivot body 11 and is prevented from rotation by the key 50 locating in the radial slots 38. As a user continues to rotate the fastening member 25 in said fastening direction, the conical head 29 acts as a wedge on the deformable member 26 which urges the mating surface 33 against the inner surface 46 of the sleeve 27 and urges the external surface 47 of the sleeve 27 against the inner surface 20 of the conical hole 12. Therefore, a lateral force is applied to the arcuate portions 43 of the circumferential wall 36 to urge said arcuate portions 43 outwardly and the frictional force between the deformable member 26 and the conical hole 12 is increased, thereby preventing rotation of the pivot body 11 relative to the support 1 about said second axis 16.

The arcuate portions 43 of the circumferential wall 36 are disposed against the sleeve 27 and radially urge the sleeve 27 against the inner surface 20 of the conical hole 12 of the second support finger 3a. As the fastening member 25 is further rotated in the tightening direction the bolt head 29 further moves towards the pivot body 11 and the arcuate portions 43 of the deformable member 26 are further urged outwardly and the pressure applied by the mating surface 45 of the deformable member 26 on the inner surface 20 of the conical hole 12, imparted via sleeve 27, is increased such that the frictional force between the deformable member 26 and the conical hole 12 is increased.

An advantage of this pivot arrangement is that the tightening of each fastening member 25 imparts a lateral force on the second support finger 3a, rather than an axial force, and so the stress concentration in each support finger 3a due to bolt tightening is reduced.

The increased frictional force applied by the deformable member 26 on the inner surface 20 of the cylindrical hole 12 increases the resistance to rotation of the pivot body 11 relative to the second support arm 3. The resistance to rotation of the second pivot joint 15 is therefore determined by setting each tapered bolt 25 in each pivot arrangement 23,24 to a predetermined torque setting.

When the pivot body 11 is rotated in the yoke relative to the support arm 3, the mating surface 45 of the deformable member 26 rotates relative to the inner surface 20 of the conical hole 12. The sleeve 27 is disposed therebetween to act as a plain bearing and prevents contact of said inner surface 20 of the conical hole 12 and mating surface 45 of the deformable member 26. As the deformable member 26 is interlocked with the pivot body 11, the deformable member 26 is prevented from rotating with the second support arm 3. The fastening member 25 is disposed to contact the deformable member 26 and the pivot body 11 only and so, because these components are prevented from rotating relative to each other, no torque is applied to the fastening member 25 when the second pivot joint 15 is rotated and so the fastening member 25 is not inclined to rotate relative to the pivot body 11. Therefore, the fastening member 25 is not inclined to rotate in a tightening direction to further engage the pivot body 11 and increase the frictional force between the deformable member 26 and the inner surface 20 of the conical hole 12, or inclined to rotate in an opposing loosening direction to disengage from the pivot body 11 and decrease the frictional force between the deformable member 26 and the inner surface 20 of the conical hole 12, when the second pivot joint 15 is rotated.

Figure 9:
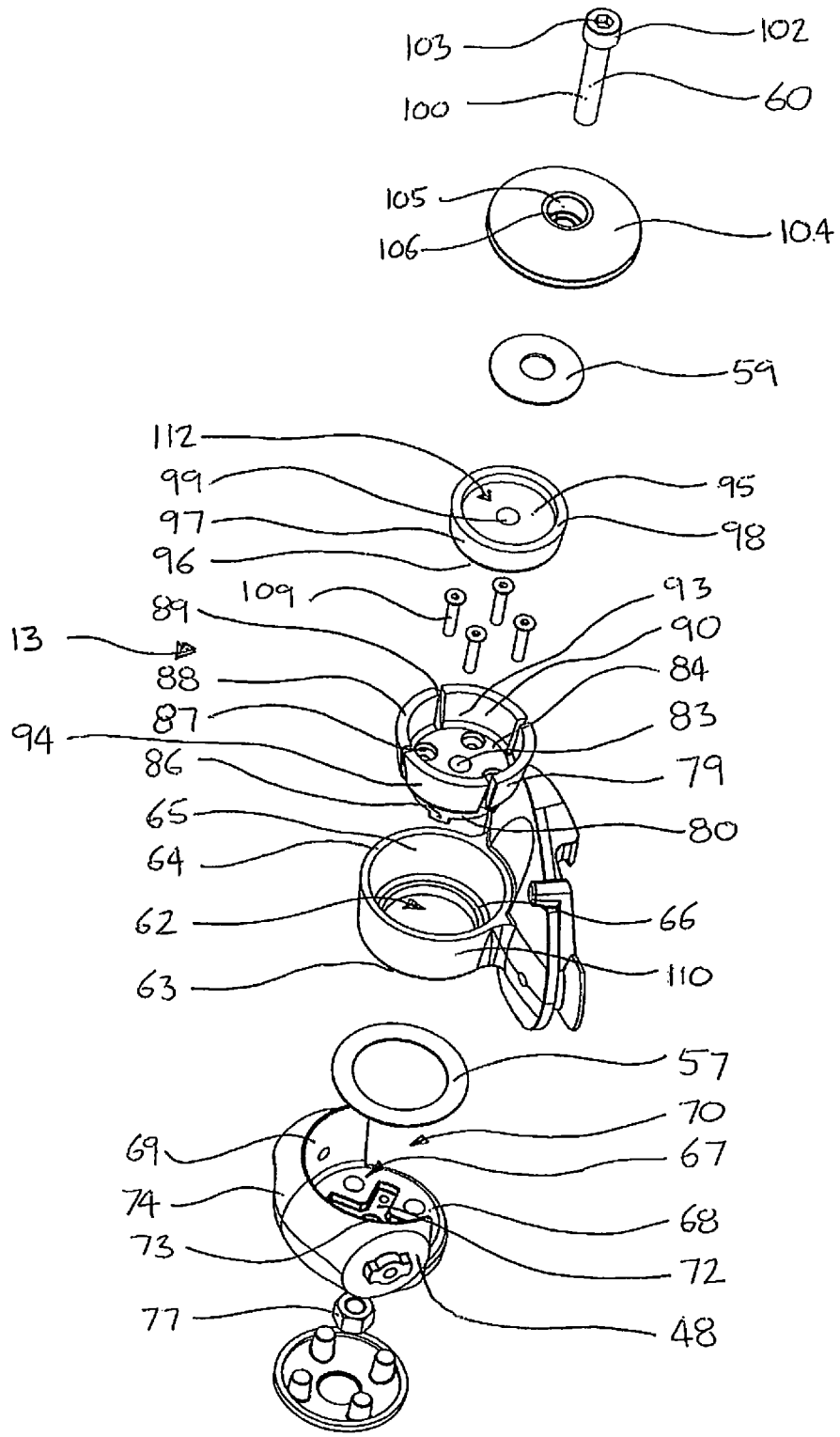
FIG. 9 is an exploded view of the assembly shown in FIG. 6.

The assembly 13 to pivotally attach a display device (not shown) to a display device support 1 will now be described with reference to FIGS. 6 and 9.

The assembly 13 enables the mounting member 7 to rotate relative to the pivot body 11 about the first axis 14. The assembly 13 comprises the mounting member 7 with a pivot collar 55, the pivot body 11 comprising a resiliently deformable friction element 56 and an attachment element 61, a washer 57, a biasing member 58, a disc spring 59 and a threaded fastener 60.

The pivot collar 55 extends from the mounting member 7 and comprises a tapered bore extending between lower and upper ends 63, 64 of the collar 55 which defines a curved inwardly facing seat 62, wherein an internal surface 65 of the seat 62 converges from the upper end 64 to the lower end 63. A circumferential shoulder 66 extends from the seat 62 around the lower end 63 of said seat 62. The mounting member 7 further comprises a quick release coupling 8 for mounting a display device (not shown) thereto, as will be described in detail hereinafter.

A recess 67 is formed in the attachment element 61 of the pivot body 11 with a base wall 68 and an arcuate side wall 69. The planar faces 48 for the second pivot joint 15 are formed on an outer surface of the arcuate side wall 69 to enable the assembly 13 defining the first pivot joint, and the second pivot joint 15 to mount to the same pivot body 11. A side opening 70 of the recess 67 is formed in the attachment element 61 of the pivot body 11 to allow rotation of the mounting member 7 about the pivot body 11 without contacting the arcuate side wall 69, as will become apparent hereinafter.

An X-shaped trough 72 is formed in the base wall 68 of the recess 67 and a through hole 73 is formed through the base wall 68 of the pivot body 11 to a nut receiving cavity 76 (refer to FIG. 10) formed in an external surface 74 of the pivot body 11. The through hole 73 defines the first axis 14 about which the mounting member 7 rotates relative to the pivot body 11. The nut receiving cavity 76 is hexagonal and has sidewalls against which a nut 77 received therein locates to prevent rotation of the nut 77 relative to the pivot body 11. A plurality of threaded bolt receiving holes 75 are also formed in the base wall 68 of the recess 67.

The resiliently deformable friction element 56 is cup shaped and comprises a cup base 78 and a circumferential cup sidewall 79 upstanding from the base 34. The circumferential cup wall 79 extends outwardly from a cylindrical side face 80 of the cup base 78 to form a step portion 82 extending therearound. A circular base aperture 83 is formed through the centre of the cup base 78 extending between a base upper face 84 and a base lower face 85. An X-shaped ridge 86 extends from the base lower face 85 and corresponds to the X-shaped trough 72 in which the ridge 86 is disposed, as will be explained hereinafter. Four recessed bolt holes 87 are also formed through the cup base 78 between the base upper face 84 and the base lower face 85.

The friction element 56 has an upper end 88 distal to the cup base 78 and four equidistant cut-outs 89 are formed in the circumferential cup sidewall 79 extending from the upper end 88 thereof to the cup base 78. The cut-outs 89 divide the circumferential cup sidewall 79 into a plurality of upstanding segments 90 which allows a greater degree of flexibility of the circumferential cup sidewall 79. Although four cut-outs are described in this embodiment, it will be appreciated that the number of cut-outs may vary and that the width of the cut-outs may vary. For example, in an alternative embodiment the circumferential cup sidewall 79 may not have any cut-outs 89 formed therein or the circumferential cup sidewall 79 may only have two opposing upstanding segments which extend partially around the cup base 78.

The upstanding segments 90 are disposed relative to each other to ensure that, when the biasing member 58, which will be described in detail below, is disposed in the friction element 56 between the upstanding segments 90, the biasing member 58 is spaced from the pivot collar 55 and does not come into contact therewith.

The circumferential cup side wall 79 extends outwardly from the cup base 78 and the inner surface 93 of the friction element 56 is tapered such that the cup side wall 79 diverges from the cup base 78 to an opening at the upper end 88 of the friction element 56. The friction element 56 also has an outer mating surface 94 which extends with the inner surface 93 and is tapered outwardly from the cup base 78 to the upper end 88 such that the diameter of the circumferential cup sidewall at the upper end 88 is greater than the diameter proximate to the cup base 78. However, in an alternative embodiment the outer mating surface does not taper.

The biasing member 58 is wedge-shaped and comprises a top face 95 and a bottom face 96. A circumferential outer surface 97 of the biasing member 58 is tapered, such that the outer surface 97 of the biasing member 58 converges from the top face 95 towards the bottom face 96 and the diameter of the top face 95 is greater than the diameter of the bottom face 96 to form a truncated cone. The biasing member outer surface 97 conforms substantially to the inner surface 93 of the circumferential cup side wall 79 and is engagable therewith.

A rib 98 upstands from the top face 95 of the biasing member 58 and circumferentially extends around an upper edge thereof. A central hole 99 communicates between the centre of the top face 95 and the centre of the bottom face 96 of the biasing member 58.

The threaded fastener 60 has a threaded shaft 100 and a bolt head 102 disposed at one end thereof. A tool engaging portion 103 is formed in the bolt head 102 in which a tool, for example an Allen key, is receivable to rotate the threaded fastener 60.

The assembly 13 further comprises a cover 104 with a cover hole 105 extending therethrough which has a circumferentially extending ledge 106 proximate to a lower side 107 thereof against which the bolt head 102 of the threaded fastener 60 is positionable when the threaded fastener 60 extends therefrom, as will be explained in detail below.

Figure 10:
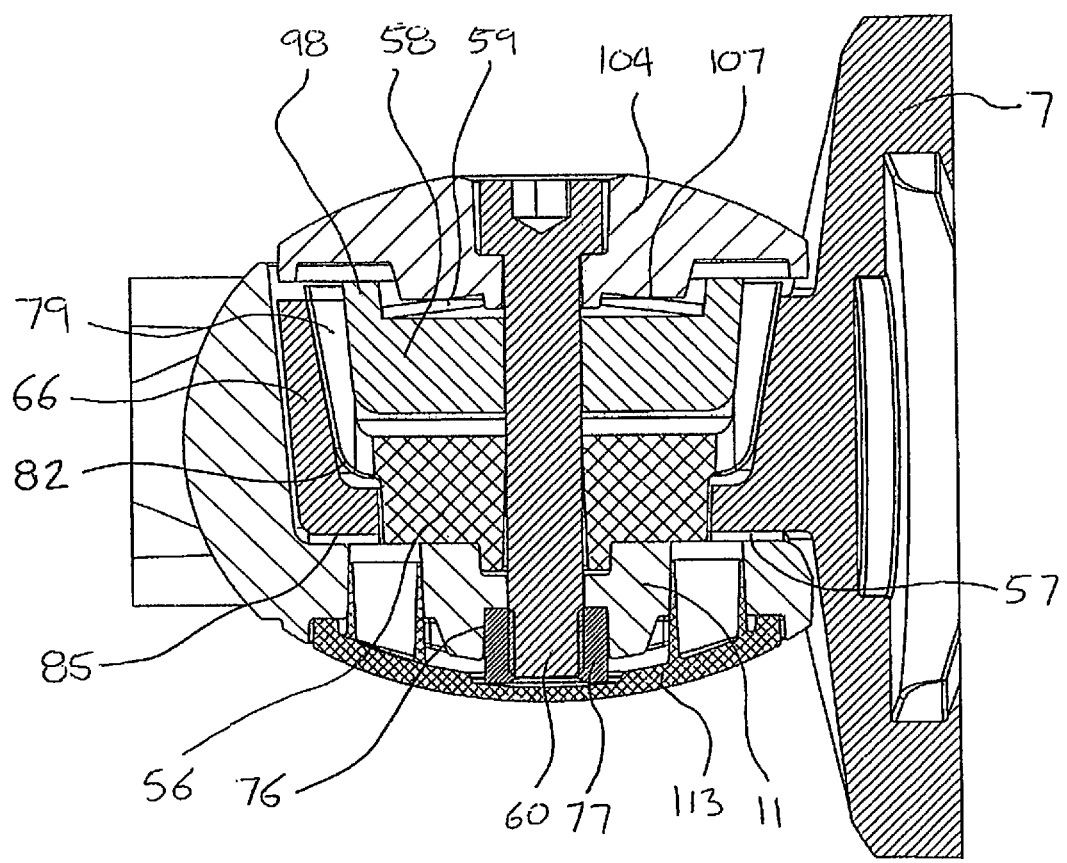
FIG. 10 is a cross sectional view of the assembly shown in FIG. 9 along the sectional line B-B shown in FIG. 5.

Assembly of the assembly 13 to pivotally attach a display device to a display device support will now be described with reference to FIGS. 9 and 10. The friction element 56 is disposed in the tapered bore 62 of the pivot collar 55 and the outer mating surface 94 of the circumferential cup sidewall 79 is located against the curved inwardly facing seat 62 of the pivot collar 55 such that it is engagable therewith. The cup base 78 of the friction element 56 extends past the circumferential shoulder 66 of the curved inwardly facing seat 62.

The pivot collar 55 and friction element 56 are located in the recess 67 of the attachment element 61 of the pivot body 11 and the arcuate sidewall 69 extends partly therearound. The washer 57 is disposed between the base wall 68 of the attachment element 61 of the pivot body 11 and the pivot collar 55 and the cup base 78 extends therebetween and locates on the base wall 68 such that the X-shaped ridge 86 locates in the corresponding X-shaped trough 72 formed in the base wall 68. Locking bolts 109 are disposed through the recessed bolt holes 87 and threadingly engage in the corresponding bolt receiving holes 75 formed in the cup base 78. Therefore, rotation of the friction element 56 relative to the attachment element 61 of the pivot body 11 is prevented due to the X-shaped ridge 86 locating in the corresponding X-shaped trough 72 and interlocking therewith, and the bolts 109 fixedly mount the friction element 56 to the pivot body 11. The bolts 109 are recessed below the level of the base upper face 84 of the base wall 68.

The pivot collar 55 is rotatable about the friction element 56, however an outer surface 110 of the pivot collar 55 is spaced from the arcuate side wall 69 of the attachment element 61 of the pivot body 11 and the washer 57 is disposed between the pivot collar lower end 63 and the pivot body base wall 68, such that the pivot body 11 and pivot collar 55 do not contact each other.

The biasing member 58 is disposed in the friction element 56. The biasing member outer surface 94 locates against the inner surface 93 of the circumferential cup side wall 79 and the biasing member bottom face 96 opposes but is spaced from the base wall 68 of the pivot body 11. The disc spring 59 is disposed on the top face 95 in an alcove 112 in the biasing member 58 defined by the rib 98. The lower side 107 of the cover 104 locates against the disc spring 59.

The nut 77 is disposed in the nut receiving cavity 76 and the threaded fastener 60 extends through the pivot body through-hole 73, the base aperture 83, the disc spring 59 and the cover 104 to threadingly engage with the nut 77.

When the threaded fastener 60 is rotated in a tightening direction by a user inserting a tool in the tool engaging portion 103, the threaded shaft 100 threadingly engages with the nut 77, which is prevented from rotating in the nut receiving cavity 76 and so the threaded fastener acts as an urging means and the threaded fastener 60 threadingly engages and moves in an axial direction towards the pivot body 11 until the bolt head 29 locates against the ledge 106 in the cover hole 105 of the cover 104.

As the threaded fastener 60 is further rotated, the bolt head 102 urges the cover 104 in an axial direction towards the pivot body 11. The lower side 107 of the cover 104 acts on the disc spring 59 which is compressed between the cover 104 and the biasing member 58. The biasing member 58 is then urged in an axial direction into the attachment element 61 of the pivot body 11 by the disc spring 59 acting on the top face 95 of the biasing member 58.

The friction element 56 is prevented from moving in an axial direction towards the pivot body 11 by the cup base 78 abutting the base wall 68 of the attachment element 61 and rotation of the friction element 56 relative to the attachment element 61 is prevented due to the X-shaped ridge 86 and the bolts 109 locating in the base wall 68. Therefore, as the threaded fastener 60 is rotated in said tightening direction, the biasing member 58 acts as a wedge and a laterally extending force is applied to the upstanding segments 90 of the circumferential cup sidewall 79 to urge said upstanding segments 90 outwardly.

As the threaded fastener 60 is rotated in said fastening direction and the biasing member 58 is moved in an axial direction into the friction element 56, the biasing member 58 acts on the friction element 56 and the upstanding segments 90 of the friction member 58 are resiliently deformed and urged outwardly to urge the outer mating surface 94 against the curved inwardly facing seat 65 to increase the frictional force between the frictional element 56 and the seat 65, thereby preventing rotation of the collar 55 of the mounting member 7 relative to the body about the first axis 14 until the frictional force is overcome. The pivot collar 66 is prevented from moving towards the pivot body 11 due to the washer disposed therebetween.

Due to the steep angle of the circumferential cup side wall 79 and the biasing member outer surface 97, the biasing member 58 is tightly wedged in the friction element 56, such that even if a user disengages the threaded fastener 60, the pivot joint is maintained and a display (not shown) mounted to the mounting member 7 will not fall.

When the mounting member 7 is rotated about the pivot body 11, the curved inwardly facing seat 65 of the pivot collar 66 rotates relative to the outer mating surface 94 of the friction element 56. As the friction element 56 is interlocked with the attachment element 61 of the pivot body 11 and the friction element 56 are prevented from rotating with the mounting member 7. The threaded fastener 60 and biasing member 58 are independent from the pivot collar 66 and engage with the pivot body 11 and friction element 56 only. Therefore, no torque is applied to the threaded fastener 60 when the assembly 13 is rotated, and so the threaded fastener 60 is not inclined to rotate relative to the pivot body 11 in a tightening direction to further engage the pivot body 11 and increase the frictional force between the frictional element 56 and the collar 66, or inclined to rotate in an opposing loosening direction to disengage the pivot body 11 and decrease the frictional force between the frictional element 56 and the collar 66, when said assembly 13 is rotated.

In an alternative embodiment, the assembly 13 does not comprise the cover 103 and the bolt head 102 of the threaded fastener 60 engages directly with the disc spring 59. In a further alternative embodiment, the assembly 14 does not comprise a disc spring 59 and the bolt head 102 of the threaded fastener 60 engages directly with the biasing member 58.

Although in the above description the biasing member 58 is wedge shaped, it will be understood that the invention is not limited thereto. In an alternative embodiment the biasing member (not shown) is cylindrical and an edge of the cylindrical biasing member acts on the inner surface 79 of the friction member 56 when the biasing member is urged therein.

Although, in each of the above embodiments the assembly 13 and the second pivot joint 15 are described as part of a display device support, it will be understood by those skilled in the art that the invention is not limited thereto and that the invention may include an assembly or pivot joint for a support arm which is mounted to allow rotation of a mounting member to which a display monitor is mounted in a single plane, or the second pivot joint 15 may be replaced by a conventional pivot joint.

Figure 11:
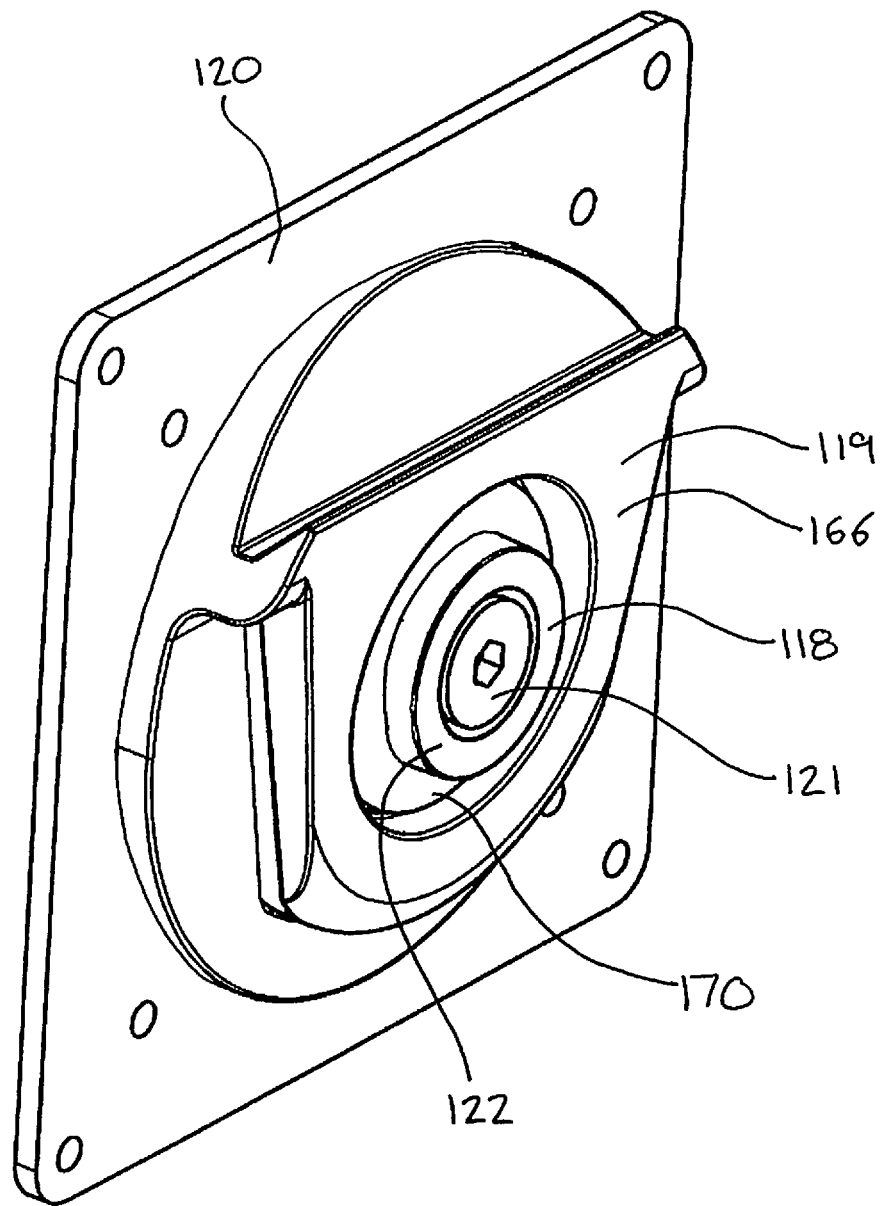
FIG. 11 is a front perspective view of a fastener for fastening a flat screen display panel mounting plate to a mounting member of an assembly for pivotally attaching a display device to a display device support.
Figure 12:
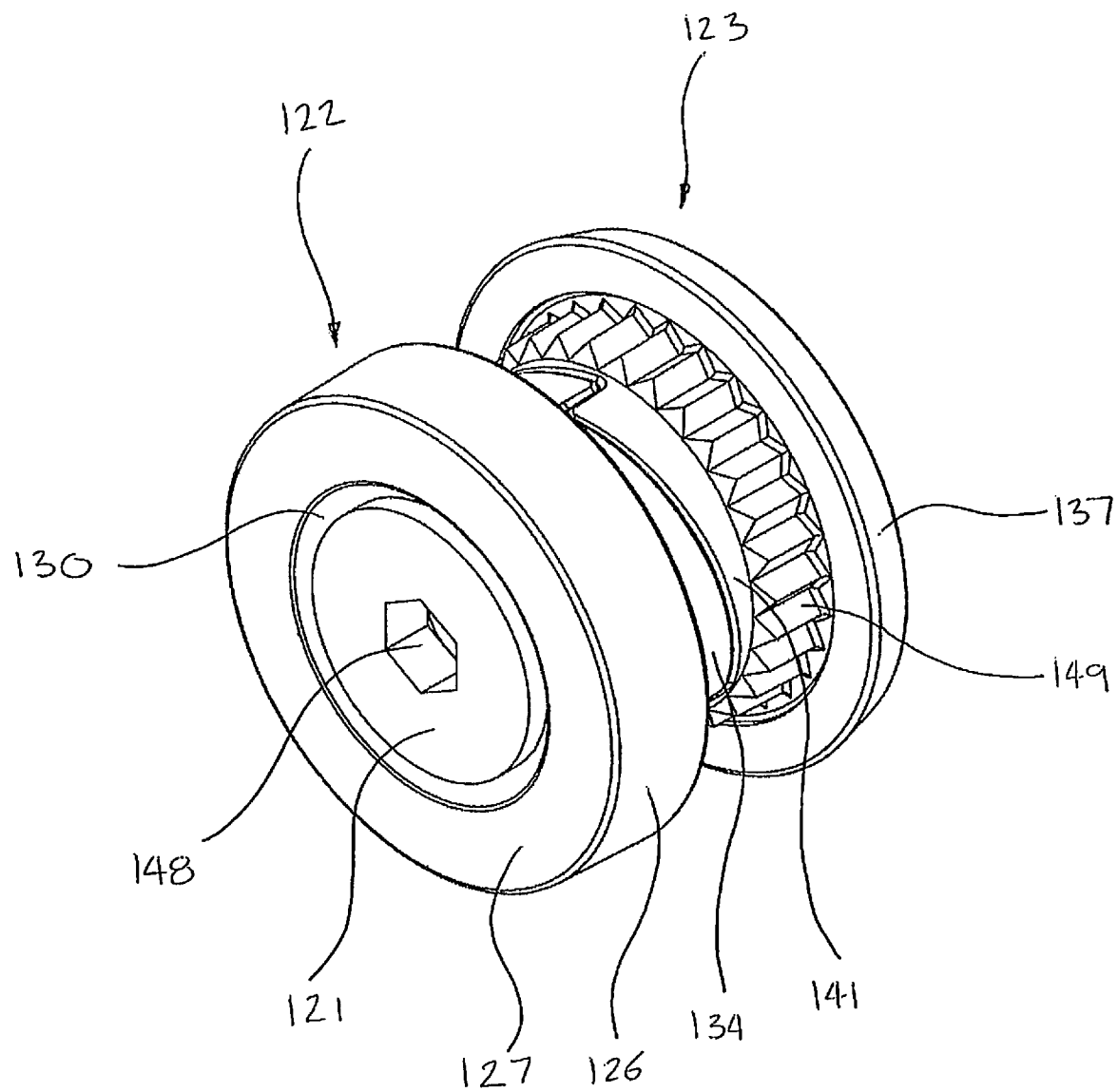
FIG. 12 is a front perspective view of the fastener shown in FIG. 11.
Figure 13:
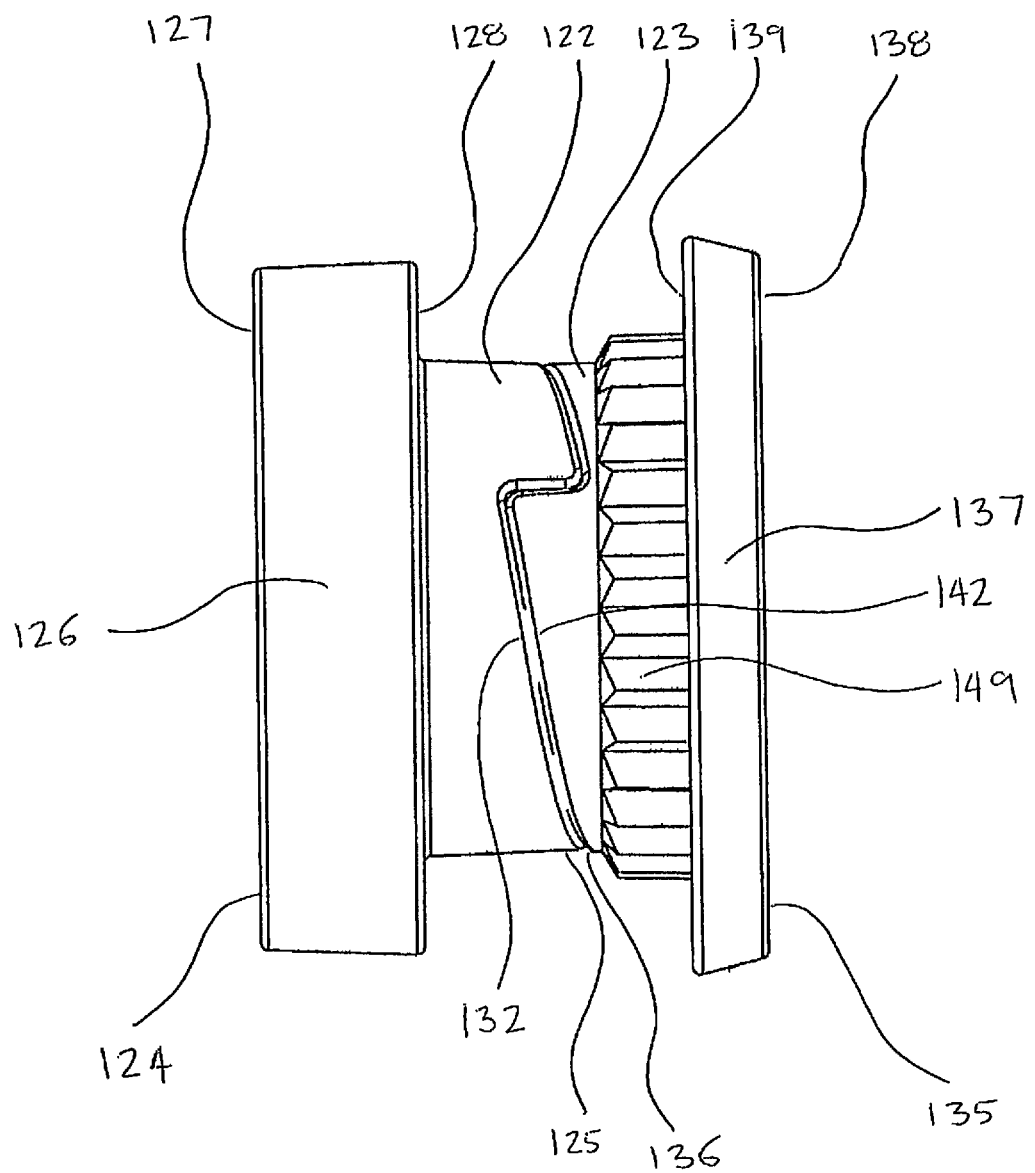
FIG. 13 is a side view of the fastener shown in FIG. 12.

Referring now to FIGS. 11 to 13, a fastener 118 according to one aspect of the invention is shown for fastening a flat screen display mounting plate 120 to a coupling member 119 of a display device support 1.

The fastener 118 comprises first and second cylindrical members 122, 123 and a tightening member 121 to fasten the first and second cylindrical members 122, 123 to each other, as will be explained in detail below.

The first cylindrical member 122 has a first end 124 and a second end 125. An outwardly extending shoulder 126 extends circumferentially around the first end 124 to form a planar face 127 and a mounting face 128. The mounting face 128 is locatable against the coupling member 119, as will be described below. A conical recess 130 is formed in the first end 124 of the first cylindrical member 122, with an opening 131 in the planar face 127. A tightening member bore 129 is formed through the first cylindrical member 122 between the conical recess 130 formed in the first end 124 and the second end 125 and the bore 129 defines an axis extending through the first cylindrical member 122.

A cam engaging face 132 is formed in the second end 125 of the first cylindrical member 122. The cam engaging face 132 comprises a three helical faces 133a, 133b, 133c (refer to FIG. 14) consecutively extending in an arcuate shape around the second end 124 of the first cylindrical member 122 about the axis defined by the tightening member bore 129. An outer cylindrical surface 134 extends around the first cylindrical member 122.

Although three helical faces are shown, it will be understood that the invention is not limited thereto, and that in alternative embodiments the cam engaging face 132 of the first cylindrical member 122 has a single helical face (not shown) or a plurality of helical faces (not shown) circumferentially extending about the axis defined by the tightening member bore 129.

The second cylindrical member 123 is substantially the same as the first cylindrical member 122 and has a first end 135 and a second end 136. An outwardly extending shoulder 137 extends circumferentially around the first end 135 to form a planar face 138 and a mounting face 139. The second cylindrical member mounting face 139 is locatable against the mounting plate 120, as will be described below. A tightening member bore 140 is formed through the second cylindrical member 123 between the first end 135 and the second end 136 of the second cylindrical member 123 and the bore 140 defines an axis extending through the second cylindrical member 123. An outer cylindrical surface 141 extends around the second cylindrical member 123.

A cam engaging face 142 is formed in the second end 136 of the second cylindrical member 123. The cam engaging face 142 of the second cylindrical member 123 corresponds to the cam engaging face 132 of the first cylindrical member 122 and comprises three helical faces 143a, 143b, 143c consecutively extending in an arcuate shape around the second end 135 of the second cylindrical member 123 about the axis defined by the tightening member bore 140. Each helical face of the first cylindrical member cam engaging face 132 locates against and abuts a corresponding helical face of the second cylindrical member cam engaging face 142 when the fastener 118 is assembled, as will be explained in detail hereinafter.

Although the cam engaging face 142 of the second cylindrical member 123 is shown with three helical faces 143a, 143b, 143c (refer to FIG. 15), it will be understood that the number of helical faces of the second cylindrical member cam engaging face 142 corresponds to the number of helical faces of the first cylindrical member cam engaging face 132, as will become apparent from the description below.

Figure 14:
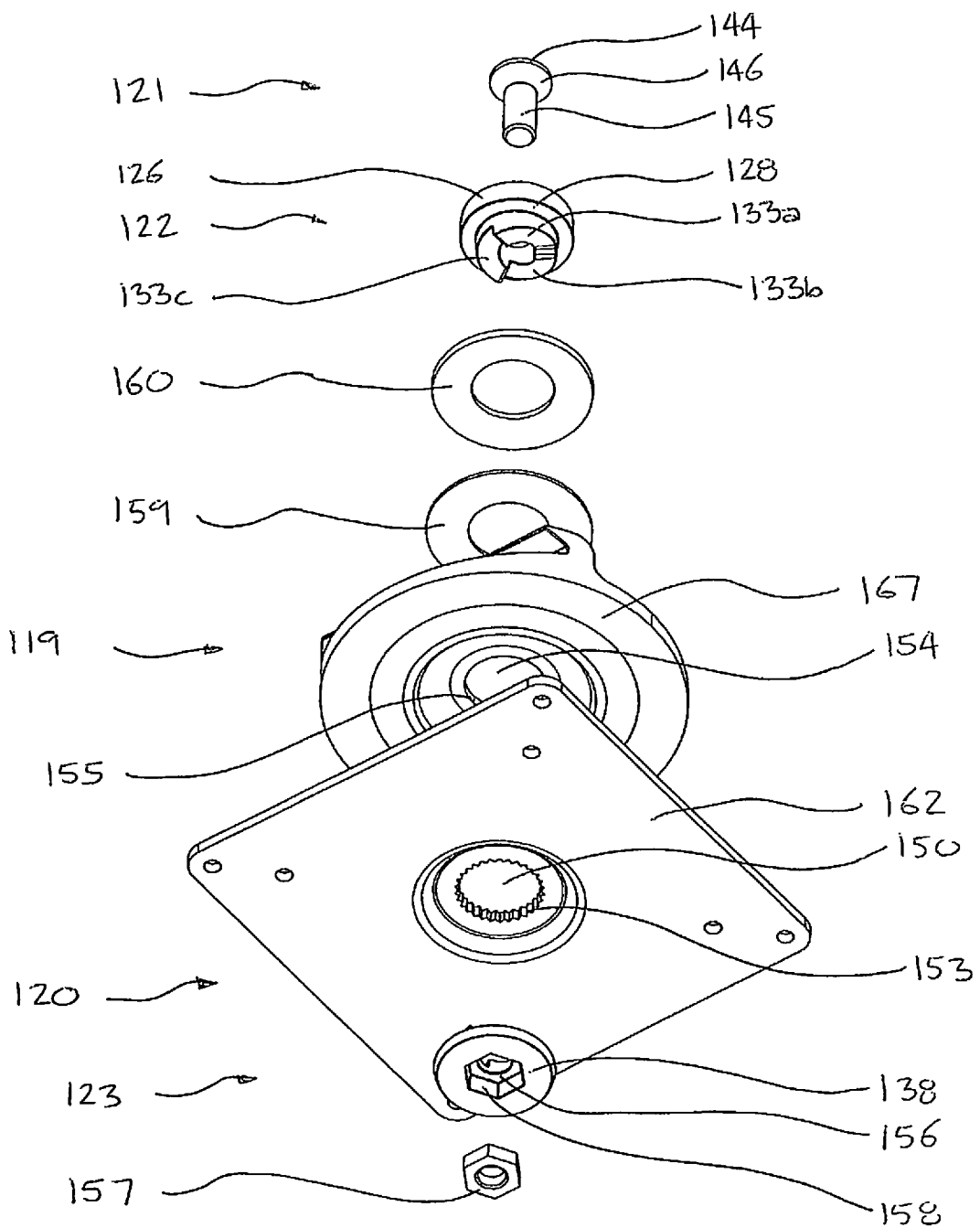
FIG. 14 is an exploded front perspective view of the fastener shown in FIG. 13.
Figure 15:
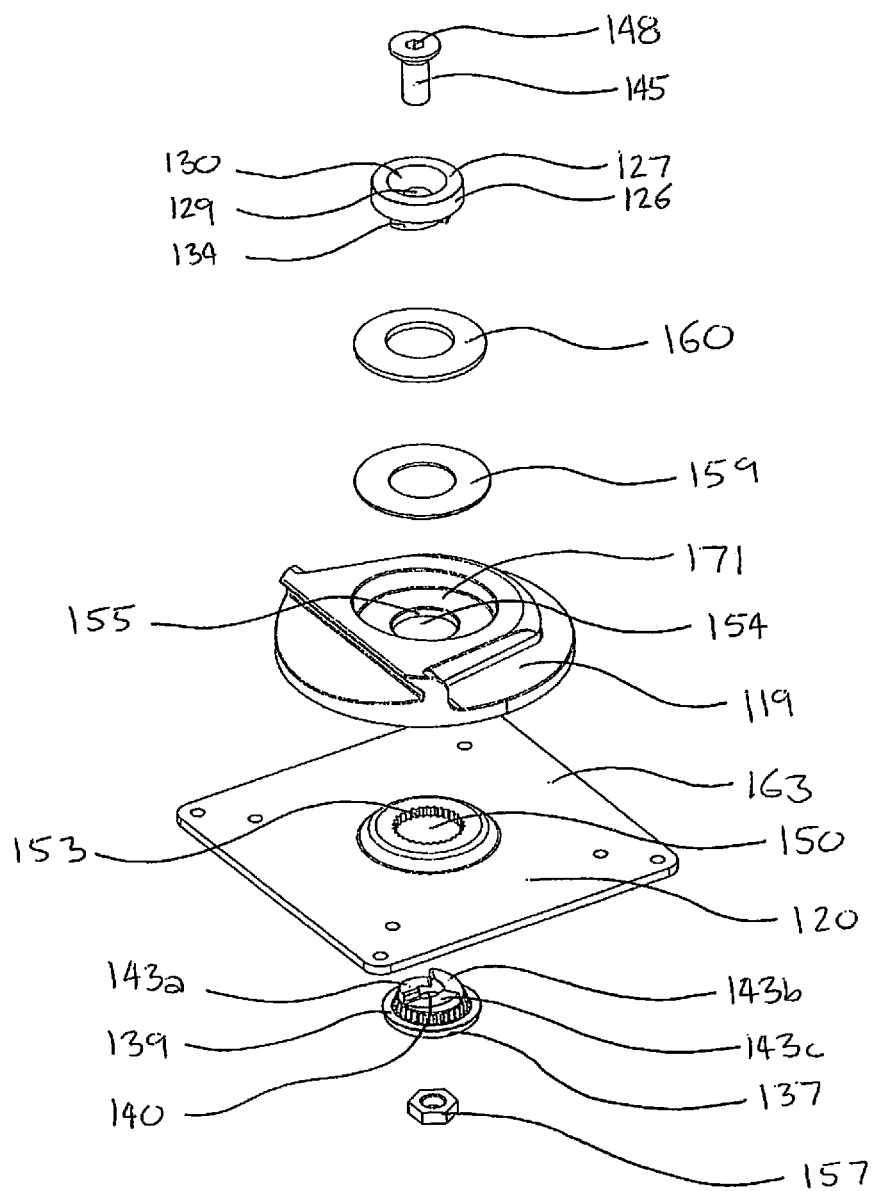
FIG. 15 is an exploded rear perspective view of the fastener shown in FIG. 13.

Referring to FIGS. 14 and 15, the tightening member 121 comprises a head part 144 and a threaded shaft part 145. A tool engaging face 148 to receive a tool for rotating the tightening member 121, for example an Allen key, is formed in one end of the head part 144 and the threaded shaft part 145 extends from the other. The head part 144 has a circumferentially extending tapered surface 146 which tapers outwardly from the threaded shaft part 145. The tapered surface 146 of the tightening member 121 conforms to a conical surface 147 of the conical recess 130 formed in the first end 124 of the first cylindrical member 122, such that when the tightening member 121 is disposed in the conical recess 130, as will be explained hereinafter, the tapered surface 146 of the tightening member 121 lies against the conical surface 147 of the conical recess 130.

The pitch of the thread of the threaded shaft part 145 of the tightening member 121 is less than the pitch of the helical faces of the first and second cam engaging faces 132, 142 of the first and second cylindrical members 122, 123 respectively. This means that for any given degree of rotation of the tightening member 121 and one of the cylindrical members 122, 123, the movement of said cylindrical member 122, 123 in an axial direction is greater than that of the tightening member 121, as will become apparent hereinafter.

The second cylindrical member 123 has a toothed region 149 protruding from its outer cylindrical surface 141 and extending circumferentially therearound. An aperture 150 is formed through the mounting plate 120 to receive the second cylindrical member 123 and the mounting plate aperture 150 has a correspondingly toothed face 153 which engages with the toothed region 149 of the second cylindrical member 123 when the second cylindrical member 123 extends therethrough to prevent the second cylindrical member 123 from rotating relative to the mounting plate 120. It will be understood that prevention of rotation of the second cylindrical member 123 is not limited to the toothed arrangement. An aperture 154 is formed through the coupling member 119 to receive the first cylindrical member 122. A plain face 155 of the coupling member aperture 154 is smooth to allow the fastener 118 to rotate therein, as will be explained in detail hereinafter.

A nut receiving alcove 156 is formed in the planar face 138 of the second cylindrical member 123, and the fastener 118 further comprises a fastening nut 157 which is receivable in the nut receiving alcove 156. The nut receiving alcove 156 comprises nut engaging walls 158 which locate against the fastening nut 157 to prevent rotation of the nut 157 relative to the second cylindrical member 123 when it is disposed therein.

The fastener 118 also includes a plain bearing in the form of a washer 159 and a resilient means in the form of a disc spring 160.

The mounting plate 120 comprises a display device locating surface 162 against which the display device (not shown) locates against and mounts thereto and a first locating surface 163 against which the coupling member 119 locates. A step portion 164 is formed in the mounting plate 120 and upstands from the coupling locating surface 163 such that a step cavity 165 is formed in the display device locating surface 162.

The coupling member 119 comprises an outer surface 166 against which the mounting member 7 locates against, as will become apparent hereinafter, and a second locating surface 167 against which the mounting plate 120 locates against. A nook 168 is formed in the second locating surface 167 such that the step portion 164 of the mounting plate 120 is received therein when the coupling member 119 and mounting plate 120 are located against each other, as will be described below.

Figure 16:
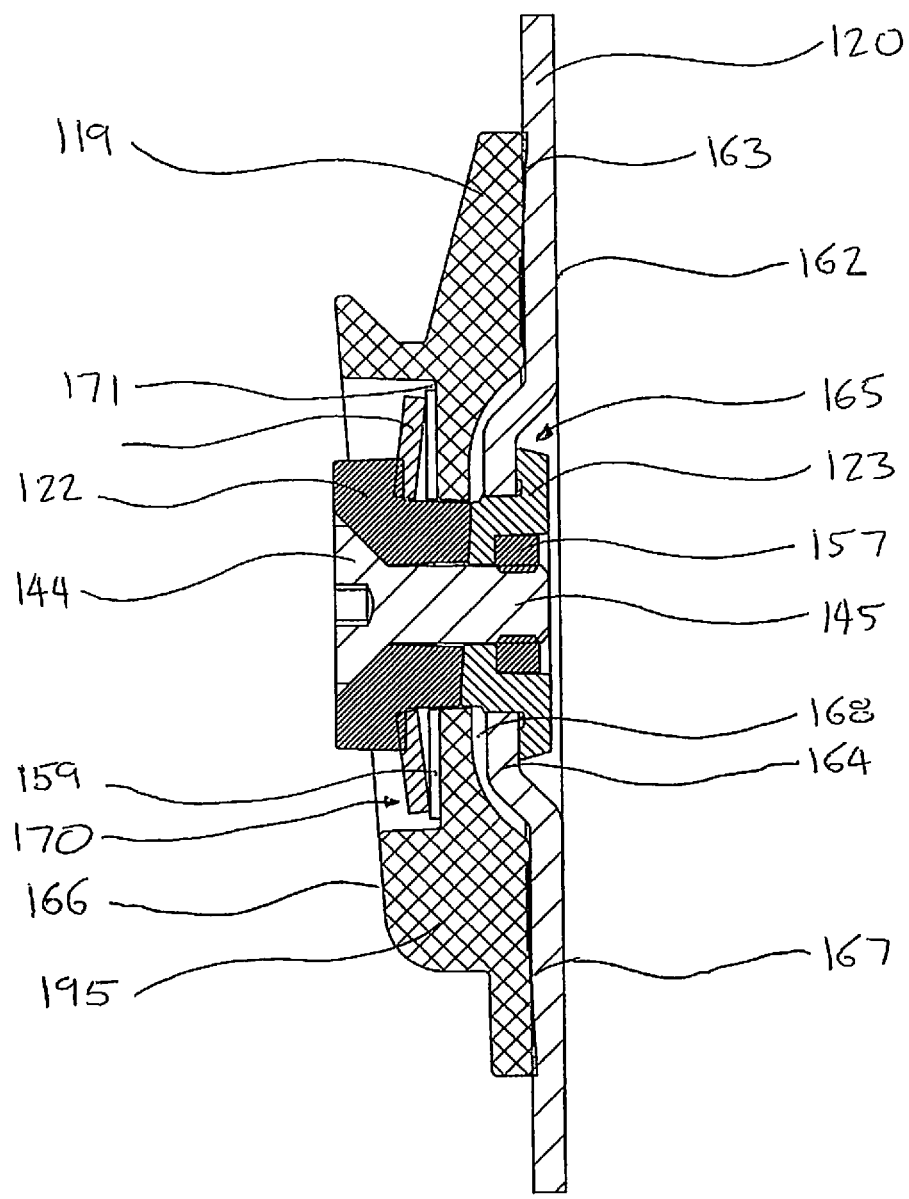
FIG. 16 is a cross-sectional side view of the fastener shown in FIG. 13.

The assembly of the fastener 118 will now be described with reference to FIGS. 14 to 16. The second cylindrical member 123 is slid into the mounting plate aperture 150 such that the planar face 138 of the second cylindrical member shoulder 137 locates in the step cavity 165 and a display device can be bolted to the mounting plate 120. The second end 125 of the second cylindrical member 123 extends through the mounting plate aperture 150. The fastening nut 157 locates in the nut receiving alcove 156.

The head part 144 of the tightening member 121 is disposed in the first cylindrical member 122 such that the tapered surface 146 of the tightening member 121 is disposed in the first cylindrical member conical recess 130 and locates against the conical surface 147 of the conical recess 130. The threaded shaft part 145 of the tightening member 121 extends from the tightening member bore 129 of the first cylindrical member 121 at the second end 125 thereof.

The washer 159 is disposed to locate around the outer cylindrical surface 134 of the first cylindrical member 122 and the disc spring 160 is disposed between the planar face 127 of the first cylindrical member shoulder 126 and the washer 159. The first cylindrical member 122 is slid into the coupling member aperture 154 and locates in a recess 170 formed in the outer surface 166 of the coupling member 119, such that the washer 159 locates against a base 171 of the recess 170 and the second end 125 of the first cylindrical member 122 extends into the coupling member aperture 154.

The coupling member 119 and the mounting plate 120 locate against each other so that the mounting plate aperture 150 and the coupling member aperture 154 align with each other and the first and second locating surfaces 163, 167 locate against each other. The threaded shaft part of the tightening member 121 extends through the tightening member bore 140 of the second cylindrical member 123 and threadingly engages with the fastening nut 157.

The cam engaging faces 132, 142 of the first and second cylindrical members 122, 123 locate against each other such that respective helical faces 133a, 133b, 133c, 142a, 142b, 142c locate against other as corresponding ramps.

For a user to tighten the fastener 118, a user inserts a tool (not shown) in the tool engaging face 148 and rotates the tightening member 121 in a fastening direction so that the tightening member 121 threadingly engages with the fastening nut 157. As the user rotates the tightening member 121, the first and second cylindrical member shoulders 126, 137 are drawn towards each other and pull the coupling member 119 and mounting plate 120 into contact with each other. The washer 159 abuts the base 171 of the recess 170 and the disc spring 160 is urged against the washer 159 by the planar face 127 of the first cylindrical member shoulder 126. As the tightening member 121 is further tightened, the disc spring 160 is compressed and provides an axial force urging the first cylindrical member shoulder 126 away from the washer 159.

Once the fastener 118 is fastened by the tightening member 121 pulling the coupling member 119 and mounting plate 120 into contact with each other, they are fixedly mounted to each other. However, the fastener 118 and mounting plate 120 are rotatable relative to the coupling member 119 about an axis extending through the tightening member 121 due to the first cylindrical member 122 being rotatable in the coupling member aperture 154, the washer acting as a plain bearing and the resilience of the disc spring 160.

Therefore, when a user wants to reposition the screen on the plane of the screen, the user simply applies a torque to the screen and rotates it about the axis of the fastener 118. The axial force applied by the tightening of the fastener 118 and the resilient nature of the disc spring 160 maintains the screen in position.

When the tightening member 121 is urged to rotate in a release direction, such that it threadingly disengages with the fastening nut 157, the first cylindrical member is urged to rotate in the same direction due to the frictional force between the tapered surface 146 of the tightening member 121 and the conical recess 130 formed in the first cylindrical member 122. The tightening member may be urged to rotate in a release direction by a user inserting a tool (not shown) in the tool engaging face 148, or due to the rotation of the mounting plate 120 relative to the coupling member 119.

To release the fastener 118, a user applies an axial force to the first cylindrical member 122 by pushing on the planar face 127 thereof. Due to the resilience of the disc spring 160, the first cylindrical member 122 is urged towards the coupling member 119. The tapered surface 146 of the tightening member 121 disengages from the conical surface 147 of the conical recess 130 such that torque is not transferred to the first cylindrical member 122 when the tightening member 121 is urged to turn in a release direction and so the tightening member 121 can be threadingly disengaged.

Although the fastener 118 is described above with a washer 159 and disc spring 160, it will be understood that in an alternative embodiment, the fastener 118 is used without these components. In particular, in an alternative embodiment, the first cylindrical member 122 is fixedly mounted to the coupling member 119 to prevent rotation of the first cylindrical member 122 relative to the coupling member 119. Alternatively, it will be understood that in a further embodiment of the invention the first cylindrical member 122 may be integrally formed with the coupling member 119 and the second cylindrical member 123 may be integrally formed with the mounting plate 120.

Although the above embodiment is described with each cam engaging face 132, 142 having helical faces 133a, 133b, 133c, 143a, 143b, 143c, it will be understood that any arrangement of cam engaging faces may be used which urge the first and second cylindrical members 122, 123 away from each other when one is rotated relative to the other.

Although the second cylindrical member 123 is described in the above embodiment with a nut and a nut receiving alcove, which threadingly engages with the tightening member to draw the first cylindrical member 122 towards the second cylindrical member 123 and fasten them to each other, it will be understood that in another embodiment of the invention the tightening member bore of the second cylindrical member 123 may be threaded such that the tightening member 121 threadingly engages with the second cylindrical member 123 itself.

Although embodiments of the present invention have been shown and described, it will be appreciated by those persons skilled in the art that the foregoing description should be regarded as a description of a preferred embodiment only, and that changes may be made to these embodiments, or that alternative embodiments are included, within the scope of the invention which is defined in the claims hereafter.

The invention claimed is:

1. A display device support, comprising: an assembly pivotally attachable to a display device to a display device support, the assembly comprising: a body attachable to a display device support; a mounting member to which a display device is mountable, the mounting member including a collar that defines an axis about which the mounting member is rotatable relative to the body together with a display device mounted thereto, the collar having a curved inwardly facing seat; a biasing member; and a resiliently deformable friction element on the body the resiliently deformable friction element interlocking with the body to prevent rotation of the resiliently deformable friction element about said axis, and the resiliently deformable friction element having an outer surface shaped to mate with the seat, the resiliently deformable friction element having at least one opening to accommodate a fastener, wherein the fastener couples the resiliently deformable friction element to the body, the biasing member and the resiliently deformable friction element being received in the collar with the mating surface facing the seat when the assembly is assembled such that, when the biasing member is moved in an axial direction into the resiliently deformable friction element, the biasing member acts on the resiliently deformable friction element and the resiliently deformable friction element is resiliently deformed by the biasing member to urge its mating surface against the seat to increase the frictional force between the resiliently deformable frictional element and the seat, thereby preventing rotation of the mounting member relative to the body about said axis unless the frictional force is overcome; and an arm having a yoke at one end to receive said body of the assembly.

2. A display device support according to claim 1, wherein the yoke is formed by two fingers extending from the end of the arm, the body being pivotally attached to each finger for rotation about a second axis at right-angles to said axis about which the mounting member rotates relative to the housing.

\* \* \* \* \*